United States Patent [19]

Albrecht

[11] Patent Number: 5,711,579
[45] Date of Patent: Jan. 27, 1998

[54] LOCKING ARRANGEMENT FOR A HEAD RESTRAINT

[75] Inventor: Björn Albrecht, Braunschweig, Germany

[73] Assignee: Volkswagen AG, Wolfsburg, Germany

[21] Appl. No.: 672,537

[22] Filed: Jun. 28, 1996

[30] Foreign Application Priority Data

Jun. 28, 1995 [DE] Germany ............ 195 23 358.1

[51] Int. Cl.⁶ .................................................. A47C 7/36
[52] U.S. Cl. .................................... 297/410; 297/391
[58] Field of Search ............... 297/440.24, 463.1, 297/391, 410

[56] References Cited

U.S. PATENT DOCUMENTS

| | | | |
|---|---|---|---|
| 4,483,565 | 11/1984 | Terui et al. | 297/410 |
| 4,674,796 | 6/1987 | Weinich et al. | 297/410 X |
| 4,695,095 | 9/1987 | Faust et al. | 297/410 |
| 4,786,108 | 11/1988 | Dauphin | 297/410 X |
| 4,844,545 | 7/1989 | Ishii | |

FOREIGN PATENT DOCUMENTS

| | | |
|---|---|---|
| 0582765A1 | 2/1994 | European Pat. Off. |
| 8102892 | 8/1981 | France. |
| 3436541 | 5/1986 | Germany. |
| 3636931 | 6/1988 | Germany. |
| 0451122 | 7/1936 | United Kingdom. |
| 0565820 | 11/1944 | United Kingdom. |
| 2194435 | 3/1988 | United Kingdom. |
| 2235370 | 3/1991 | United Kingdom. |
| 2280707 | 2/1995 | United Kingdom. |

OTHER PUBLICATIONS

French Search Report dated 6 Mar., 1997 in Application FR530391.
British Search Report dated 14 Oct. 1996 in Application No. GB 9613495.2.

*Primary Examiner*—Milton Nelson, Jr.
*Attorney, Agent, or Firm*—Brumbaugh, Graves, Donohue & Raymond

[57] ABSTRACT

In the embodiments disclosed in the specification, a locking arrangement for a head restraint which can be locked to a frame of a vehicle seat includes two parallel retaining bars received in corresponding tubular guides. A force-transmission element arranged within a hollow retaining bar transmits force from a knob in the head restraint to actuate a blocking member which is engageable with a latch array in the corresponding tubular guide.

19 Claims, 5 Drawing Sheets

LOCKING ARRANGEMENT FOR A HEAD RESTRAINT

BACKGROUND OF THE INVENTION

This invention relates to locking mechanisms for head restraints for motor vehicle passengers.

In modern automobile manufacturing use is made of head restraints which are connected to a vehicle seat so that they can be fixed to the seat framework and be released for adjustment and positioning purposes by actuating a locking mechanism. For example, German patent No.34 36 541, discloses a head restraint locking mechanism having a release element with a sliding guide which is arranged approximately parallel to a sliding guide for the head-restraint retaining bar which is to be locked in position. Other head restraint arrangements have been disclosed in which the release element for the locking mechanism can be moved essentially at a right angle with respect to the axis of the head-restraint guide as described, for example, in German patent No. 36 36 931. Such arrangements have basically been proven in practice. However, ever increasing requirements for operational convenience, on the one hand, and for constructions having the lightest possible weight, on the other hand, necessitate further improvement of such head restraints.

SUMMARY OF THE INVENTION

Accordingly, it is an object of the present invention to provide a locking arrangement for head restraints which overcomes the disadvantages of the prior art.

Another object of the invention is to provide a head restraint locking mechanisms having low weight and improved convenience of operation while maintaining the advantages of conventional restraint locking arrangements.

These and other objects of the invention are attained by providing a head restraint locking arrangement having a force-transmitting element disposed within a retaining bar for the head restraint and arranged to provide a coupling between an operating element for the locking arrangement and a blocking element for locking the head restraint in position. With this arrangement, it is possible to eliminate all of the guide elements for a force-transmitting element for the locking mechanism which are conventionally disposed within the vehicle seat. Instead, all that is required for the seat is the provision of recesses in the retaining-bar guides which are present in any case. The hollow shape of the retaining bars which is necessary for the integration of the force-transmitting element also provides a greater flexural strength for the retaining bar for the same amount of material.

According to a particularly advantageous embodiment of the invention, the force-transmitting element is in the form of an adjustment rocker lever which can be pivoted within the retaining bar about an axis of rotation extending essentially transversely with respect to the longitudinal axis of the retaining bar. The adjustment rocker lever is preferably coupled to the operating element for the locking arrangement by a retaining rod and moves a blocking element between a locking position and a release position in response to actuation of the operating element. When the locking arrangement is in a locking position, the adjustment rocker lever itself is not subject to any substantial stresses and it can therefore be relatively thin and lightweight. Moreover, because the rocker lever bears directly against the inner wall of the retaining bar itself, a supporting effect is produced which likewise permits the lever to be light in weight without impairing the reliability of the locking arrangement.

Alternatively, especially lightweight locking arrangements can also be achieved if the force-transmitting element is, for example, a so-called Bowden cable or a combination of operatively connected slave and master pistons.

According to another aspect of the invention the operating element for the locking arrangement is positioned in the head restraint itself rather than being positioned in the seat backrest. It is thus possible to adjust the position of the head restraint with a convenient single-handed operation, providing an improvement in convenience. By locating the operating element within a cup-shaped member recessed in the cushion in one side of the head restraint, the aesthetic effect of the head restraint on passengers within the vehicle is not impaired. Only slight constructional changes in the head restraint frame itself are necessary in order to adapt existing head restraint structures to accommodate the locking arrangement of the invention.

It should also be noted that head restraints having locking arrangements according to the invention provide a substantial simplification of the seat construction and also the seat assembly.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

In all the figures, identical components or component segments have the same number.

Figure 1:
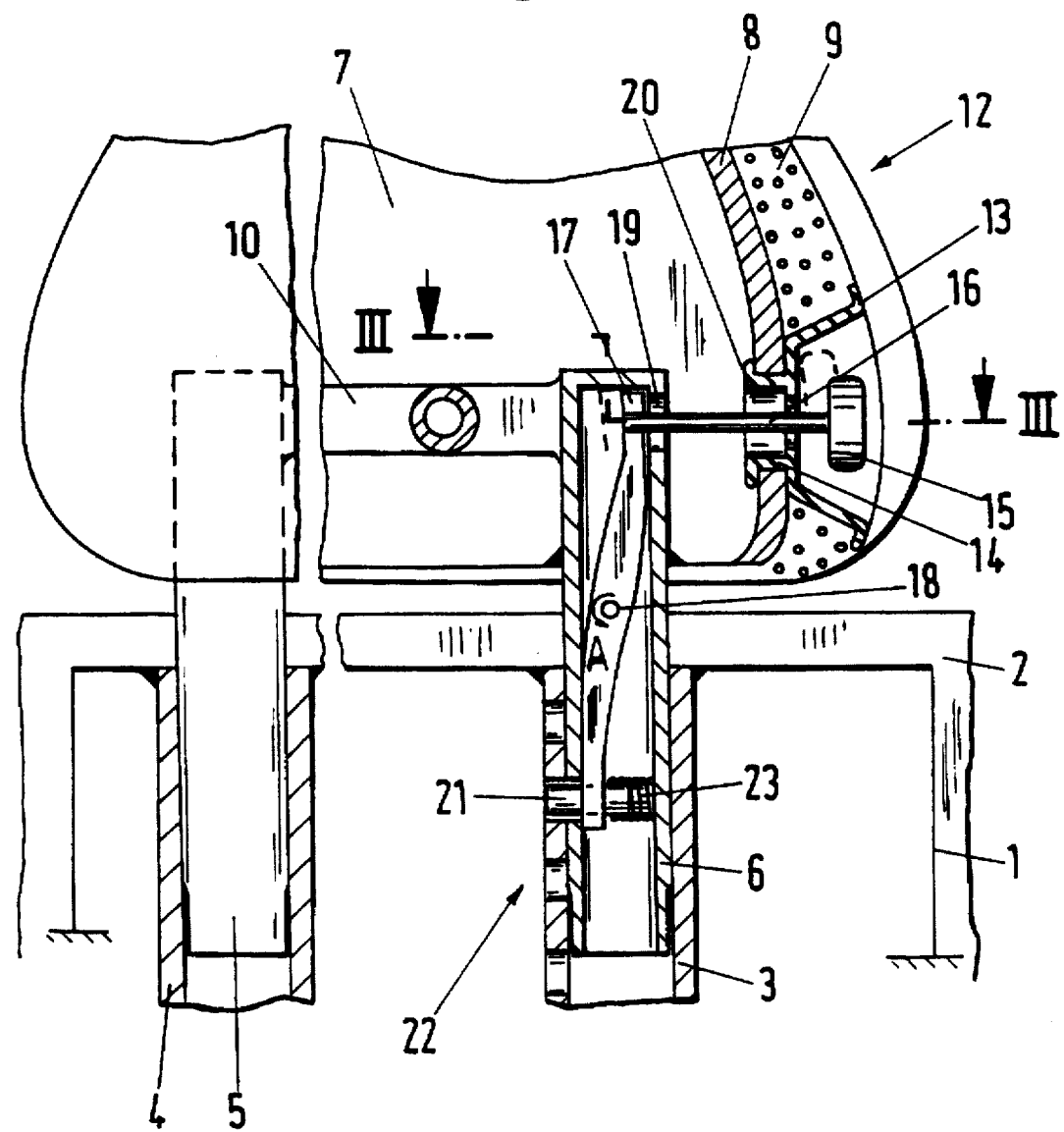
FIG. 1 is a schematic front view, partly in section, illustrating a representative embodiment of a locking arrangement according to the invention.
Figure 1A:
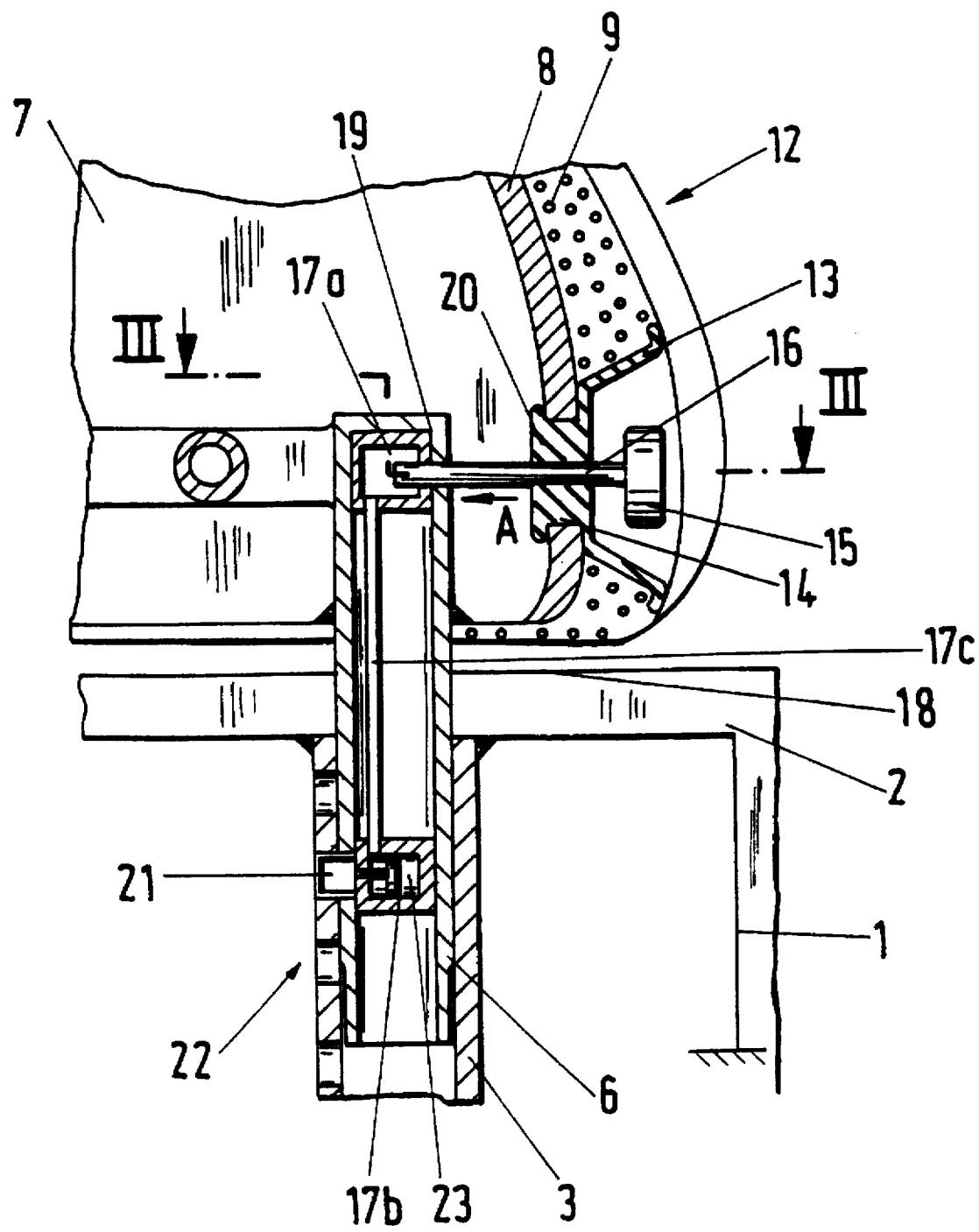
FIGS. 1a and 1b are views similar to FIG. 1 showing alternative embodiments.

In the typical embodiment of the invention shown in FIG. 1, a schematically represented seat frame 1 is part of a backrest 2 which is illustrated only in a fragmentary way. Two parallel tubular guides 3 and 4 are affixed to the seat frame 1 and two corresponding parallel retaining bars 5 and 6 of head restraint 7, only partly shown, are longitudinally displaceable in the guides 3 and 4. Additional conventional components of the head restraint 7 include a head-restraint frame 8, which holds the retaining bars 5 and 6, and a foam cushion 9 providing a headrest. The parallel disposition of the retaining bars 5 and 6 is maintained by a carrier element 10 which is fastened to the upper end of each of the retaining bars 5 and 6 by a retaining link 11, shown in FIG. 3, which may constitute, for example, welding, soldering, tacking or the like.

Figure 4:
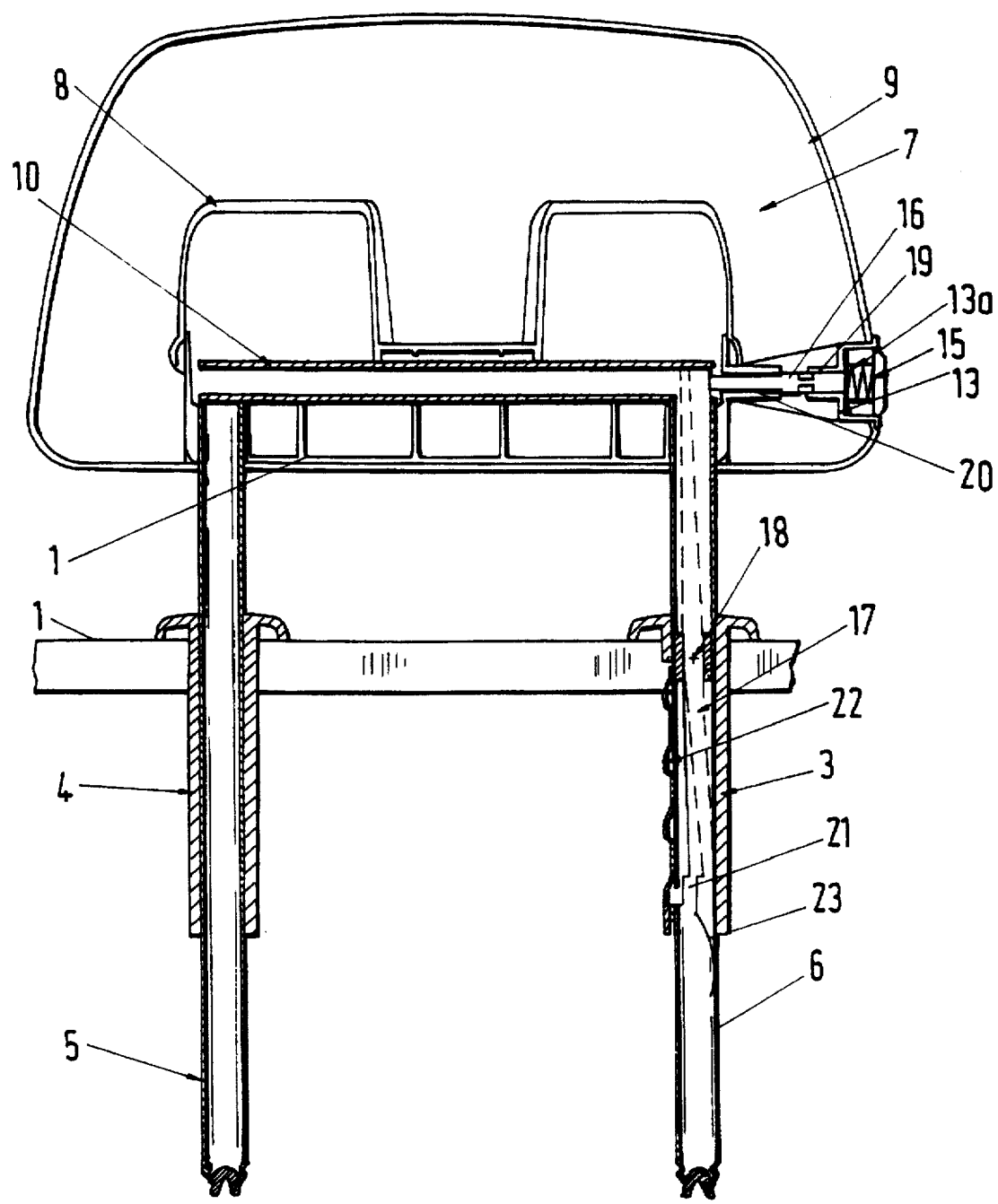
FIG. 4 is a schematic sectional view illustrating an advantageous exemplary embodiment of the locking arrangement.

A dimensionally stable cup-shaped member 13 is mounted by a molded flange 14 in the frame 8 so that it penetrates the foam cushion 9 at one side 12 of the head restraint 7 and is received in a recess in the head-restraint frame 8. Positioned within the cup-shaped member 13 is an actuating knob 15 for operating a locking mechanism. The knob 15 is coupled through an actuating rod 16 to an adjustment rocker lever 17 which is pivotably mounted within the retaining bar 6. The pivot mounting includes a pivot pin 18 which is fixed to the retaining bar 6, as shown in FIG. 1, or a bearing sleeve 18a fixed therein as shown in FIG. 4. The pin 18 may be mounted by screwing or by pressing or by any joining technique comparable therewith.

In the exemplary embodiment illustrated in FIG. 1, the activating rod 16 is attached to the adjustment rocker lever 17 in a rotationally fixed manner so that the actuating knob 15 has to pivot as the adjustment rocker lever 17 moves into the position indicated by dashed lines. The necessary freedom of angular movement of the actuating knob 15 is assured by providing openings 19 and 20 in the upper end of the retaining bar 3 and in the cup-shaped member 13, respectively, which are large enough in the plane of motion of the lever 17 and the rod 16. As an alternative, in the exemplary embodiment illustrated in FIG. 4 the recesses 19 and 20 constitute guide sleeves for the actuating rod 16 which in this case is merely urged like a tipping lever by a spring 13a against the upper end of the adjustment rocker lever 17 in a rotating and sliding manner, so that the actuating knob 15 acts as a sliding knob. It is also possible for the actuating rod 16 to be articulated on the upper end of the adjustment rocker lever 17.

The retaining bar 6 is locked with respect to the seat frame 1 by a blocking element 21 which in the embodiment of FIG. 1 is fixedly connected to the lower end of the adjustment rocker lever 17 and can be latched into one of several latch openings of a latching profile 22 in the guide 3. The blocking condition of the element 21 is maintained by a compression spring 23 which urges the lower end of the adjustment rocker 17 toward the latching profile 22. The spring 23 is illustrated as a helical spring but leaf springs mounted directly on the adjustment rocker lever 17 or on the retaining bar 6, as shown in FIG. 4, or elastic clamping bodies may also be used as spring elements in the same manner. Instead of affixing the blocking element 21 to the adjustment rocker lever 17 it is also possible to provide a blocking element 21 which is displaceable against spring force in a longitudinal guide which is oriented transversely with respect to the longitudinal axis of the retaining bar 6. In this case, the lower end of the adjustment rocker lever 17 could be shaped like a fork or claw to enable it to move the blocking piece back and forth for the purpose of locking or unlocking the retaining bar from the guide.

It will be apparent from FIGS. 1 and 4 that only single-handed operation is required to adjust the position of the head restraint 7. Because the actuating knob 15 is positioned in the lower region of the head restraint 7, the head restraint 7 itself can be grasped at the bottom for the adjustment movement by a vehicle passenger who can at the same time, actuate the locking mechanism with the thumb of the same hand. By merely pivoting the actuating knob 15 upwardly into the position illustrated by broken lines in FIG. 1, the adjustment rocker lever 17 is simultaneously rotated about the pivot pin 18 as illustrated by the rotational arrow A to move the blocking piece 21 out of the latching profile 22. The urging force of the spring element 23 is selected so that secure locking of the blocking piece 21 in the latching profile 22 is assured, even when the backrest vibrates, while making certain that the actuating force required to depress the actuating knob 15 is not uncomfortably great. After the head restraint 7 has been positioned at the desired height, locking takes place by simple release of the actuating knob 15 and alignment of the blocking piece 21 with an opening in the latch profile 22. The block piece snaps into the latching profile as soon as it is opposite a corresponding latching opening.

It is also of particular significance in this connection that the actuating knob 15 is recessed within the contour of the head restraint 7 in the cup-shaped member 13. This assures that the aesthetic overall impression of the head restraint 7 is not adversely affected and, moreover, that no risk of injury or of unintentional manipulation is provided by a protruding part.

Figure 3:
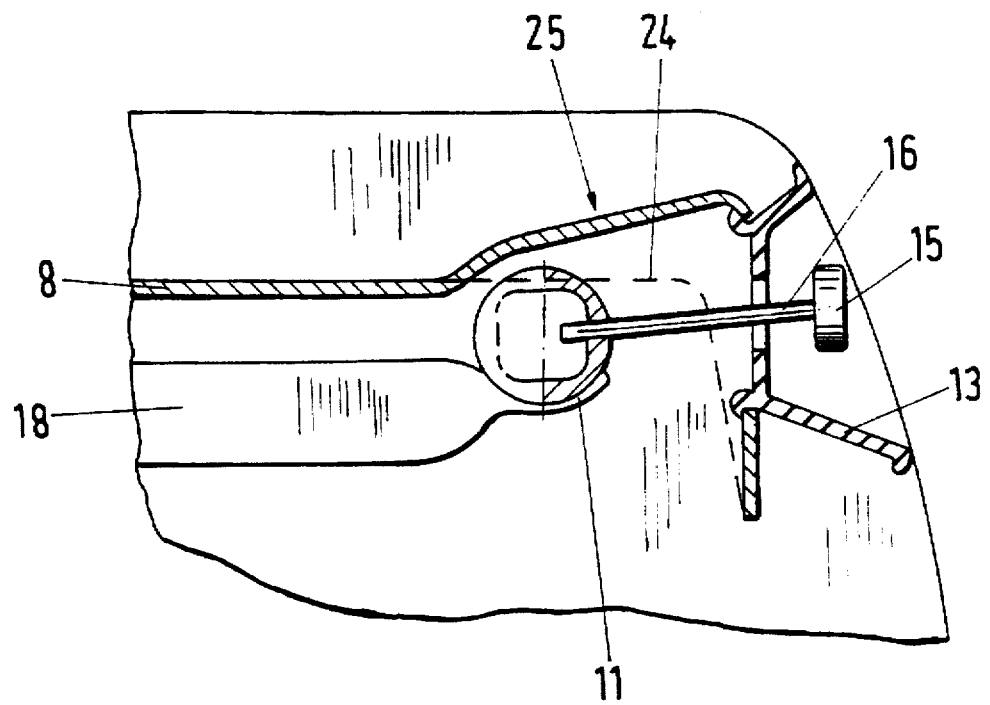
FIG. 3 is a sectional view taken along the line III—III of FIG. 1 and looking in the direction of the arrows.

As best seen in FIG. 3, only slight constructional changes are required to apply the locking arrangement of the invention to conventional head restraint structures. For example, a dashed line 24 shows the contour profile of a conventional head-restraint frame. With little cost for tool modification, the profile of the head restraint frame 8 can be set back from that profile to conform to the curved projection 25.

Figure 2:
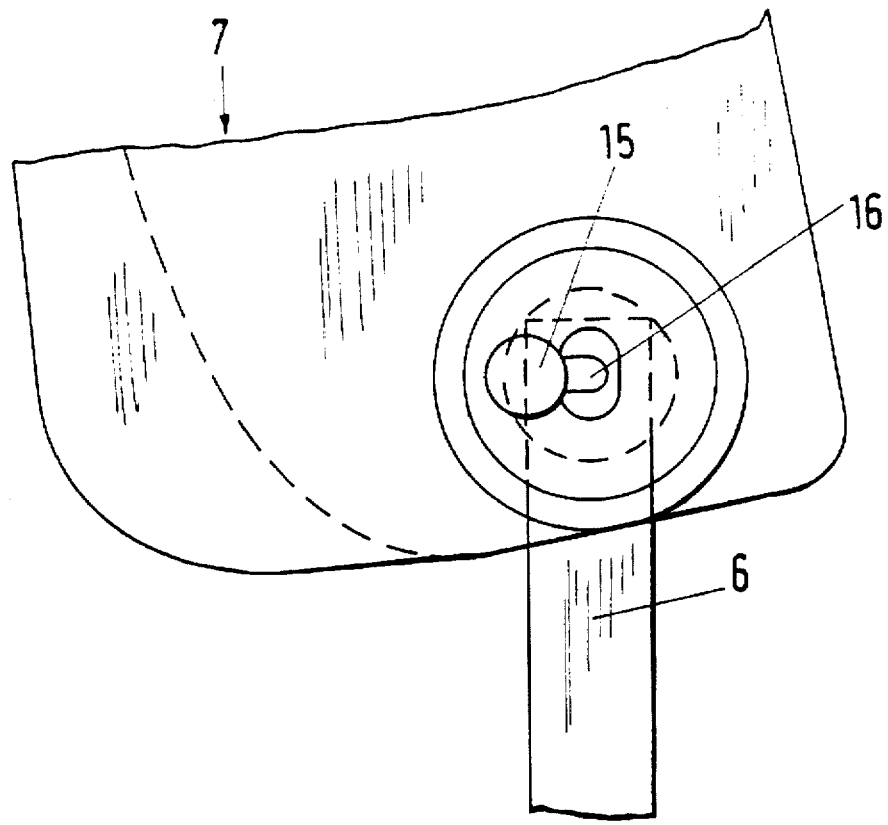
FIG. 2 is a side view of the locking mechanism illustrated in FIG. 1.

FIGS. 2 and 3 illustrate an internal passage in the retaining bar 6 which has a polygonal cross section, i.e., that of a quadrilateral with rounded corners. It is also possible, however, to provide a passage of circular or oval cross section. The retaining bar 6 itself, moreover, may consist of one or of two shells.

In the embodiment shown schematically in FIG. 1 a the force-transmitting arrangement includes a master piston 17a an a slave piston 17b, which are operatively connected through a fluid line 17c. In this case, the compression spring 23 engages a piston plate in the slave piston 17b to urge the blocking element 21 outwardly. By displacing the actuating rod in the direction of the arrow A, the pressure in the master piston 17a is raised so that the piston plate in the slave piston 17b is moved to the right, pulling the blocking element 21 out of the latching profile 22. In this release position, the head restraint 7 can be adjusted.

Figure 1B:
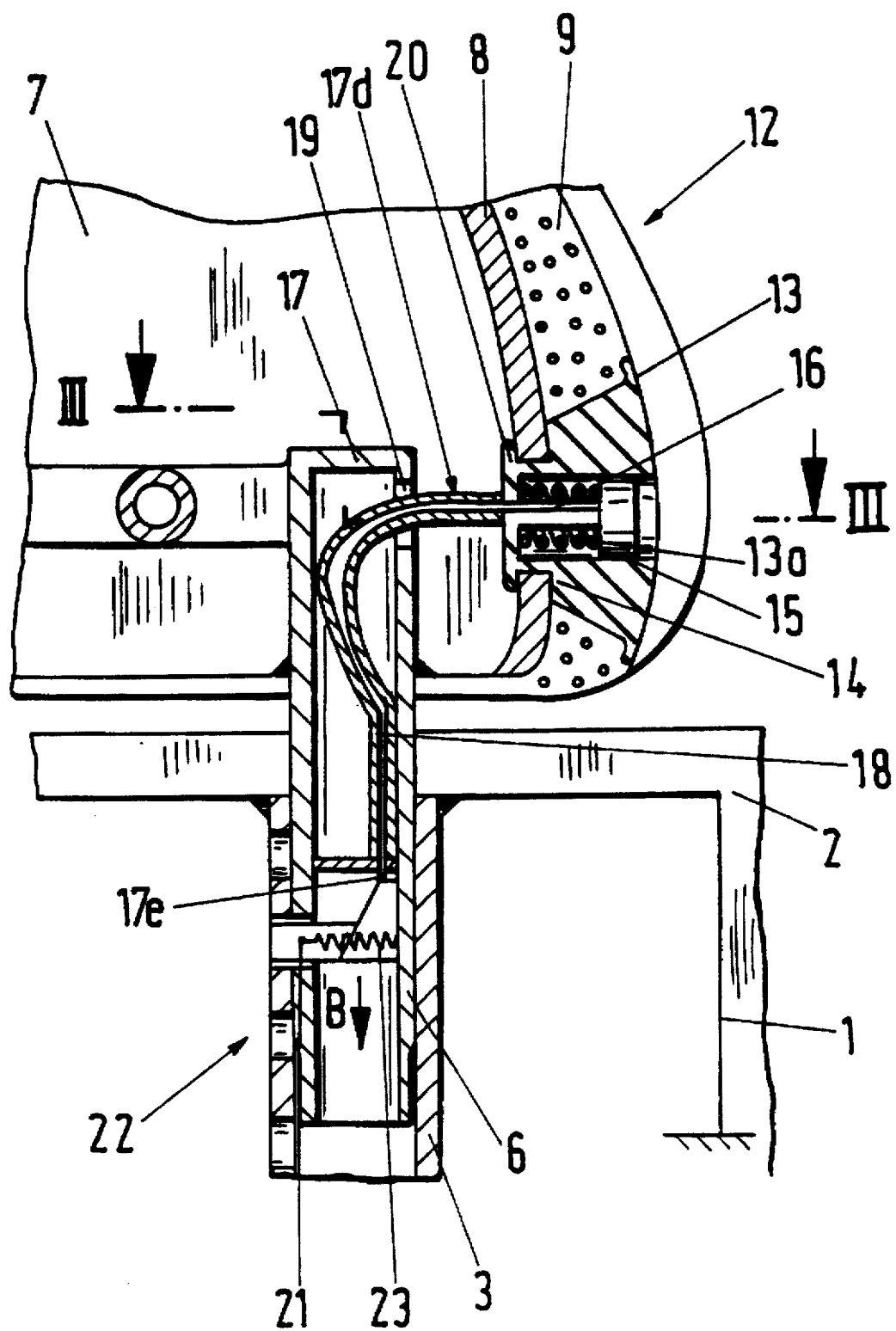

FIG. 1b illustrates schematically a further embodiment which includes a force-transmission element in the form of a Bowden cable 17d with a sliding core 17e which pushes a wedge 17f downwardly when the knob 15 is depressed. The wedge 17f normally secures the blocking element 21 in the latching profile 22 by its wedge surface. By moving the wedge 17f in the direction of the arrow B when the actuating knob 15 is actuated, the blocking element 21 is pulled into a release position by a tension spring 23.

It should be evident from the foregoing that the components required for the locking arrangement of the invention are of small size and accordingly are scarcely significant in terms of their inherent weight. By virtue of the integration of the latching profile 22 into the guide 3, the guide 3 itself is lightened by the introduction of a series of holes and, moreover, weight is saved because an additional latching member does not need to be attached to the guide 3 or to the seat frame 1.

Although the invention has been described herein with reference to specific embodiments, many modifications and variations therein will readily occur to those skilled in the art. Accordingly, all such variations and modifications are included within the intended scope of the invention.

I claim:

1. A locking arrangement for a head restraint supported in a vehicle seat comprising a seat frame, a latching array affixed to the seat frame, a head restraint having at least one retaining bar, a blocking element in the retaining bar which can be positioned in a latching manner at various heights with respect to the latching array, and a force-transmitting element within the retaining bar arranged to be acted upon at one end by an operating element associated therewith and operatively connected at another end to the blocking element, thereby causing the blocking element to be engaged with or released from the latching array upon operation of the operating element so as to permit adjustment of the position of the head restraint.

2. A locking mechanism according to claim 1 wherein the force-transmitting element is a Bowden cable.

3. A locking arrangement according to claim 1 wherein the force-transmitting element comprises a master piston coupled to the operating element, a slave piston which is coupled to the blocking element and a fluid line connecting the master piston and the slave piston.

4. A locking mechanism according to claim 1 wherein the force-transmitting element is an adjustment rocker lever within the retaining bar which is pivotably supported from the retaining bar.

5. A locking arrangement according to claim 4 wherein the blocking element is supported for motion essentially transversely with respect to a longitudinal axis of the retaining bar and is arranged to receive a projection provided on the adjustment rocker lever.

6. A locking arrangement according to claim 4 wherein the retaining bar has a tubular structure with a substantially circular outer contour and an internal passage with a polygon-shaped cross section.

7. A locking arrangement according to claim 4 including a spring means within the retaining bar for urging the adjustment rocking lever in a direction to cause the blocking element to be moved toward a blocking position in the latching array.

8. A locking arrangement according to claim 7 wherein the spring means is a compression spring.

9. A locking arrangement according to claim 1 including a frame in the head restraint and a cushion mounted on the head restraint frame and wherein the operating element is supported from the frame of the head restraint.

10. A locking arrangement according to claim 9 including a cup-shaped member in the head restraint cushion wherein the operating element is arranged within the cup-shaped member so as to be recessed within the cushion and the cup-shaped member.

11. A locking arrangement according to claim 9 wherein the operating element comprises a push-button.

12. A locking arrangement according to claim 11 wherein the push-button is affixed to an actuating rod affixed to the force-transmitting element.

13. A locking arrangement according to claim 11 wherein the push-button is affixed to an actuating rod which is displaceably guided in the head restraint frame and the force-transmitting element is acted upon by an opposite end of the actuating rod.

14. A locking arrangement for a head restraint supported in a vehicle seat comprising a seat frame, a latching array affixed to the seat frame, a head restraint having at least one retaining bar, a blocking element operatively connected to the retaining bar which can be positioned in a latching manner at various heights with respect to the latching array, an operating element in the head restraint, a force-transmitting element arranged to be acted upon at one end by the operating element and operatively connected at the other end to the blocking element, thereby causing the blocking element to be engaged with or released from the latching array so as to permit adjustment of the position of the head restraint.

15. A locking arrangement according to claim 14 wherein the operating element is a push button.

16. A locking arrangement according to claim 15 including a cushion mounted on a head restraint frame and a cup-shaped member in the head restraint cushion and wherein the operating element is arranged within the cup-shaped member so as to be recessed within the cushion and the cup-shaped member.

17. A locking arrangement according to claim 15 wherein the push button is affixed to an actuating rod affixed to the force-transmitting element.

18. A locking arrangement according to claim 14 including a frame in the head restraint and wherein the operating element is supported from the frame of the head restraint.

19. A locking arrangement according to claim 18 wherein the operating element is affixed to an actuating rod which is displaceably guided in the head restraint frame and the force-transmitting element is acted upon by an opposite end of the actuating rod.

* * * * *

UNITED STATES PATENT AND TRADEMARK OFFICE
CERTIFICATE OF CORRECTION

PATENT NO. : 5,711,579

DATED : January 27, 1998

INVENTOR(S) : Björn Albrecht

It is certified that error appears in the above-identified patent and that said Letters Patent is hereby corrected as shown below:

Column 5, line 3, "mechanism" should read --arrangement--.

Signed and Sealed this

Twenty-eighth Day of July, 1998

Attest:

BRUCE LEHMAN

*Attesting Officer*     *Commissioner of Patents and Trademarks*